Figure 1:
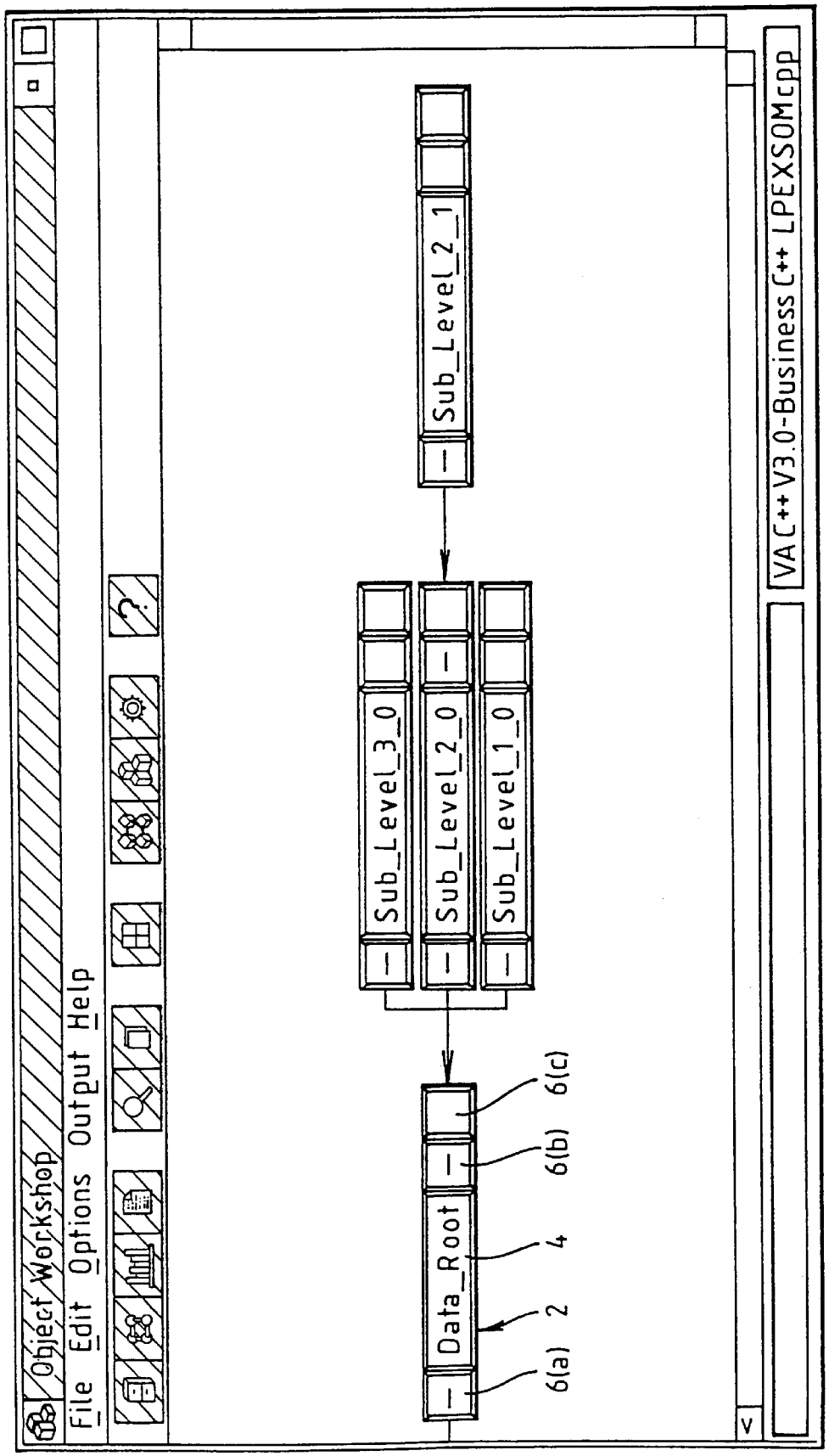

United States Patent [19]
Musgrove et al.

[11] Patent Number: 5,852,439
[45] Date of Patent: Dec. 22, 1998

[54] OBJECT BROWSER AND MANIPULATION SYSTEM

[75] Inventors: Rupert Jeremy Musgrove, Alcester, United Kingdom; David Kay, Melbourne, Australia

[73] Assignee: JBA Holdings PLC, Birmingham, United Kingdom

[21] Appl. No.: 608,626

[22] Filed: Mar. 1, 1996

[51] Int. Cl.[6] .................................................. G06F 17/00
[52] U.S. Cl. .......................................... 345/339; 345/353
[58] Field of Search ...................... 345/339, 340, 345/341, 343, 348, 335, 326, 350, 351, 352, 353, 354, 355, 356, 357, 358; 395/349, 346, 342

[56] References Cited

U.S. PATENT DOCUMENTS

| | | | |
|---|---|---|---|
| 5,375,149 | 12/1994 | Harrow et al. | 395/342 |
| 5,479,589 | 12/1995 | Peterson et al. | 395/335 |
| 5,483,633 | 1/1996 | Johnson | 395/339 |
| 5,515,492 | 5/1996 | Li et al. | 395/333 |
| 5,544,299 | 8/1996 | Wenstrand et al. | 395/339 |
| 5,555,365 | 9/1996 | Selby et al. | 395/340 |
| 5,577,188 | 11/1996 | Zhu | 395/342 |
| 5,627,979 | 5/1997 | Chang et al. | 345/335 |
| 5,638,523 | 6/1997 | Mullet | 345/326 |
| 5,692,205 | 11/1997 | Berry et al. | 345/349 |

FOREIGN PATENT DOCUMENTS

| | | |
|---|---|---|
| 0 465 149 A2 | 1/1992 | European Pat. Off. . |
| 0 585 131 A2 | 3/1994 | European Pat. Off. . |
| 0 621 527 A1 | 10/1994 | European Pat. Off. . |
| 0 623 871 A2 | 11/1994 | European Pat. Off. . |
| 2 229 301 | 9/1990 | United Kingdom . |

*Primary Examiner*—Raymond J. Bayerl
*Assistant Examiner*—Steven P. Sax
*Attorney, Agent, or Firm*—Salter & Michaelson

[57] ABSTRACT

A method of manipulating objects using an object browser and manipulation system is described. The system comprises components for representing on a display unit respective objects, the components each comprising an object identifier region. Each component has at least one defined active sub-region, the active sub-region having the capability to display information relating to a state of the component and its respective object and having a functionality activatable by the user through an input device to effect an operation in relation to the component. The method comprises the steps of;

a) providing at least one component in the form of an image on the screen of the display unit, b) providing an input device operable by the user to activate the functionality of a first active sub-region of the component and c) providing on the screen of the display unit an image corresponding with the outcome of the operation of the functionality of the fist active sub-region.

16 Claims, 6 Drawing Sheets

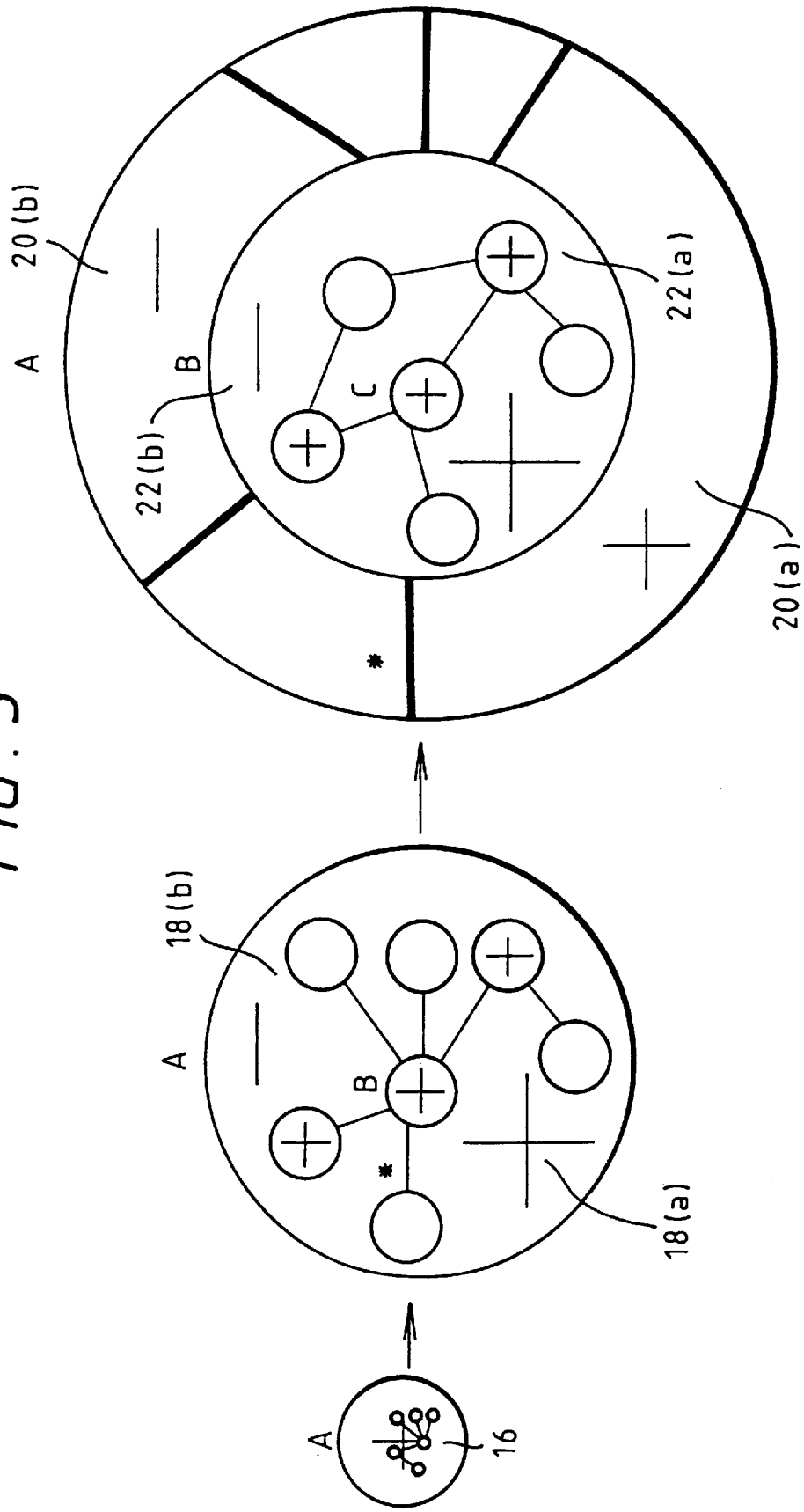

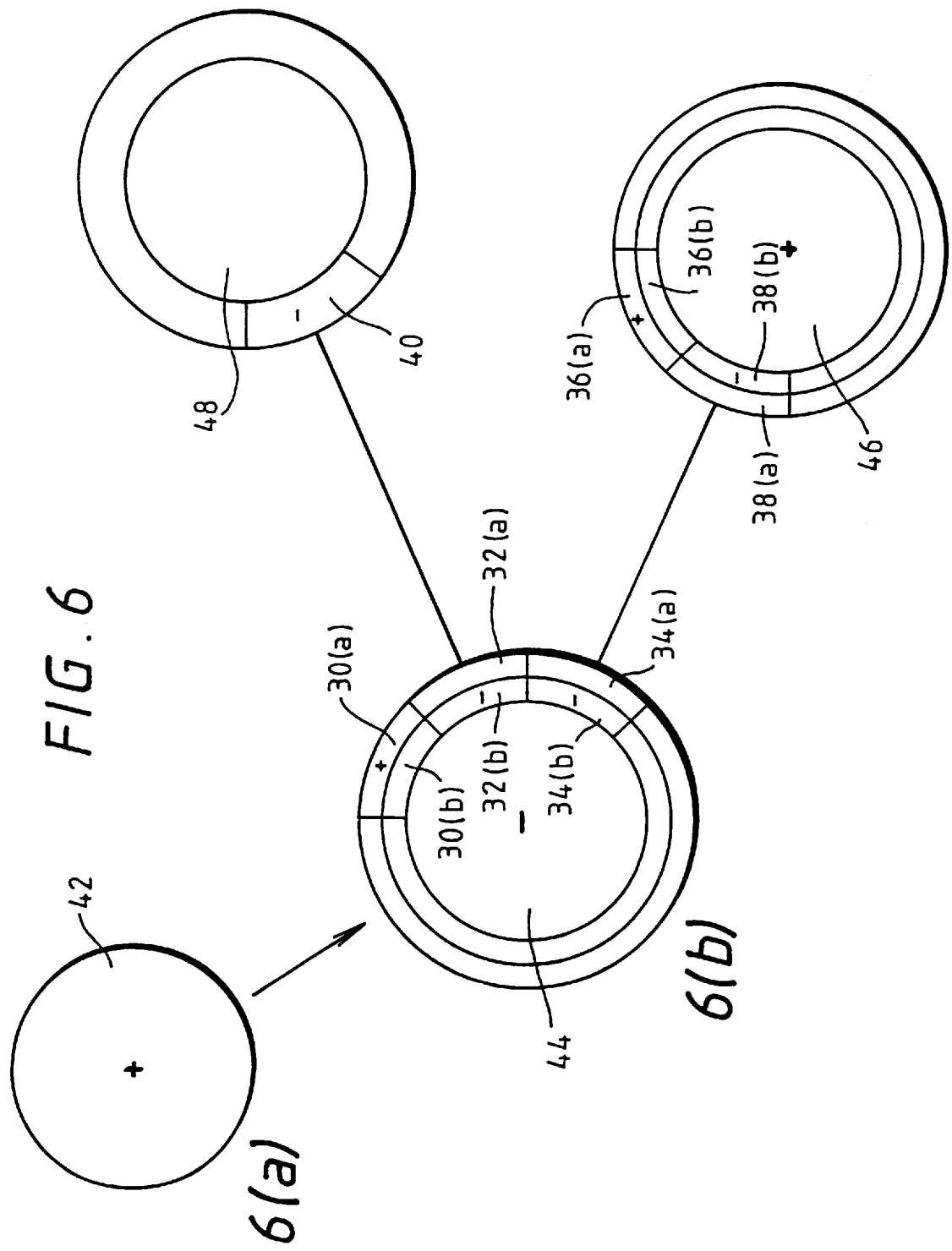

OBJECT BROWSER AND MANIPULATION SYSTEM

The present invention relates to an object browser and manipulation system and a method of manipulating objects using the system.

Existing hierarchy viewers provided only limited capabilities for manipulating the display. Using mouse pointing devices or keyboard cursor keys allowed the user to browse through the hierarchy but there was little functionality. However, existing functionality has been developed to provide single functionality to the file represented by a component. The existing functionality provides expansion or contraction of sub-level information such as sub-directory files in the parent directory. Technology has been advanced to provide visual information on the parent directory file component which indicates to the user the existence or absence of available sub-directory information. This information is usually provided in the form of a "+" to indicate sub-level information may be expanded, a "−" when expansion has occurred and contraction of sub-level information may take place and " " when there is no sub-information to be displayed.

The existing functionality only allows the user to effectively browse through screen hierarchies and does not allow any control over screen presentation. Other operations are generally achieved by the use of separate functionality means or operating system commands in a multi-stage process which includes entering, viewing and leaving browse mode; entering, activating and leaving functionality mode and re-entering browse mode to review the hierarchy. The present invention addresses this problem and provides a unique solution which ensures that users of this technology never become overwhelmed with unwieldy and uninformative amounts of information in any one representation. In addition, the invention gives the ability to allow a much finer level of control on the information via a plurality of active sub-regions which provide significant user benefits and increased functionality.

According to a first aspect of the present invention there is provided a method of manipulating objects using an object browser and manipulation system comprising components for representing on a display unit respective objects, the components each comprising an object identifier region and at least one defined active sub-region, the active sub-region having the capability to display information relating to a state of the component and its respective object and having a functionality activatable by the user through an input device to effect an operation in relation to the component, the method comprising the steps of;

a) providing at least one component in the form of an image on the screen of the display unit, b) providing an input device operable by the user to activate the functionality of a first active sub-region of the component and c) providing on the screen of the display unit an image corresponding with the outcome of the operation of the functionality of the first active sub-region.

The term object is used to describe any physical or logical entity such as a framework, file, item, sub-system, program etc which can be represented by a screen component.

In increasingly complex environments, customised presentations of information would allow the user to dispense with unwieldy and uninformative amounts of information in any one representation.

According to a second aspect of the present invention there is provided an object browser and manipulation system comprising components for representing on a display unit respective objects, the components each comprising an object identifier region and at least one defined active sub region, the active sub-region having the capability to display information relating to a state of the component and its respective object and having a functionality activatable by the user through an input device to effect an operation in relation to the component.

Preferably, there are a number of active sub-regions of each component and these can be assigned various functions depending upon the particular environment and user requirements. For example, an active sub-region can be assigned the functions of create/remove a new sub-level (e.g. sub-directory), add/remove an association link, perform a zoom-in/zoom-out function (to examine levels of granularity), provide 3-d extractions, hide/reveal components etc.

The component can be in any convenient form such as, without limitation, a square, circle or rectangular image. However, the variable form of the image must be adapted to incorporate the active sub-region.

Typically, the active sub regions form a distinct part of the component but in a variation of the invention the active sub-regions may not strictly form part of the component but in such cases they are nevertheless proximate thereto and associated therewith in a manner which allows the necessary ease of manipulation by the user.

Conveniently, the active sub-region may be in the form of a key pad which is activatable by either keyboard or mouse click input devices. The function of the active sub-region may include non-hierarchy browsing functions such as expansion and contraction facilities. However, the expansion and contraction facility are, typically, provided in separate sub-regions of the invention. Advantageously, this allows a component to display the fact that it has both contracted and expanded information. This increased functionality is made possible by the use of a third function key or sub-region which allows individual components to be sub-sumed into the parent with or without the other objects in the same sub-level. In this manner, a new hierarchy, customised to the users requirements, can be produced. The user simply expands the required components subsumes the non-required components on the particular sub-level and repeats the operation with the components of the sub-level until he has built up the desired customised hierarchy.

The number of sub-regions is not limited to 3 and a greater number of sub-regions may be used depending upon environment requirements.

In addition to representing the hierarchy described, other function keys can be provided which allow direct manipulation of the object. For instance, new sub-levels can be created or removed and association links between components and their respective objects can be implemented. Such a facility takes the invention a step further by performing direct manipulation of the objects represented by the components. It is envisaged that the invention will be extremely useful in object orientated programming environments, hierarchical manipulation environments, hierarchical zooming for information purposes, 3D extractions, combinations, tool building and associations and tree manipulation.

The invention effectively steps out of control key and menu driven functionality and provides direct component manipulation to the user by standard input devices. The positioning of the active regions is crucial to the invention as it provides convenience to the user and encourages a fine level of control of both screen presentation and manipulation.

Figure 2:
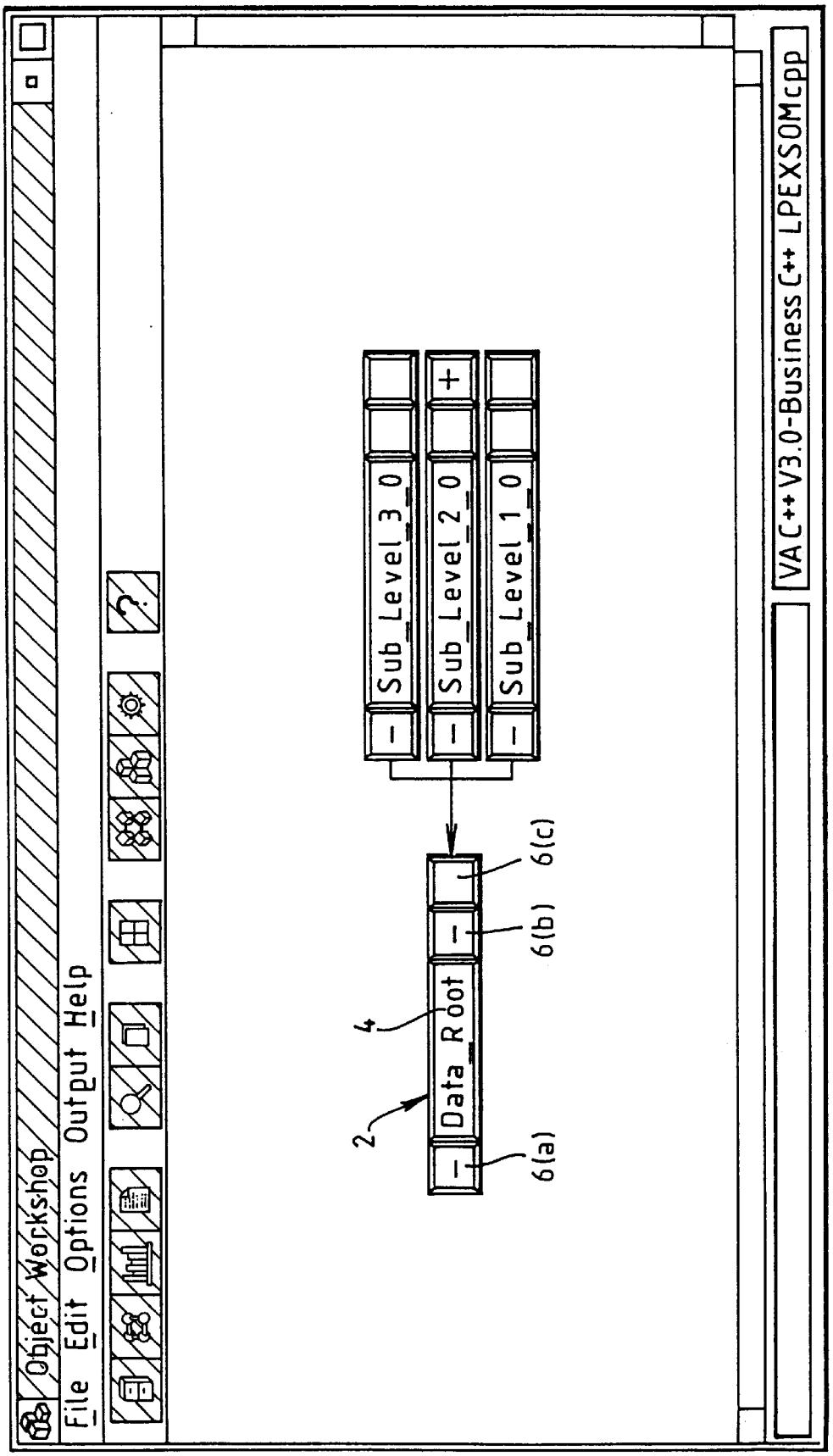
Figure 3:
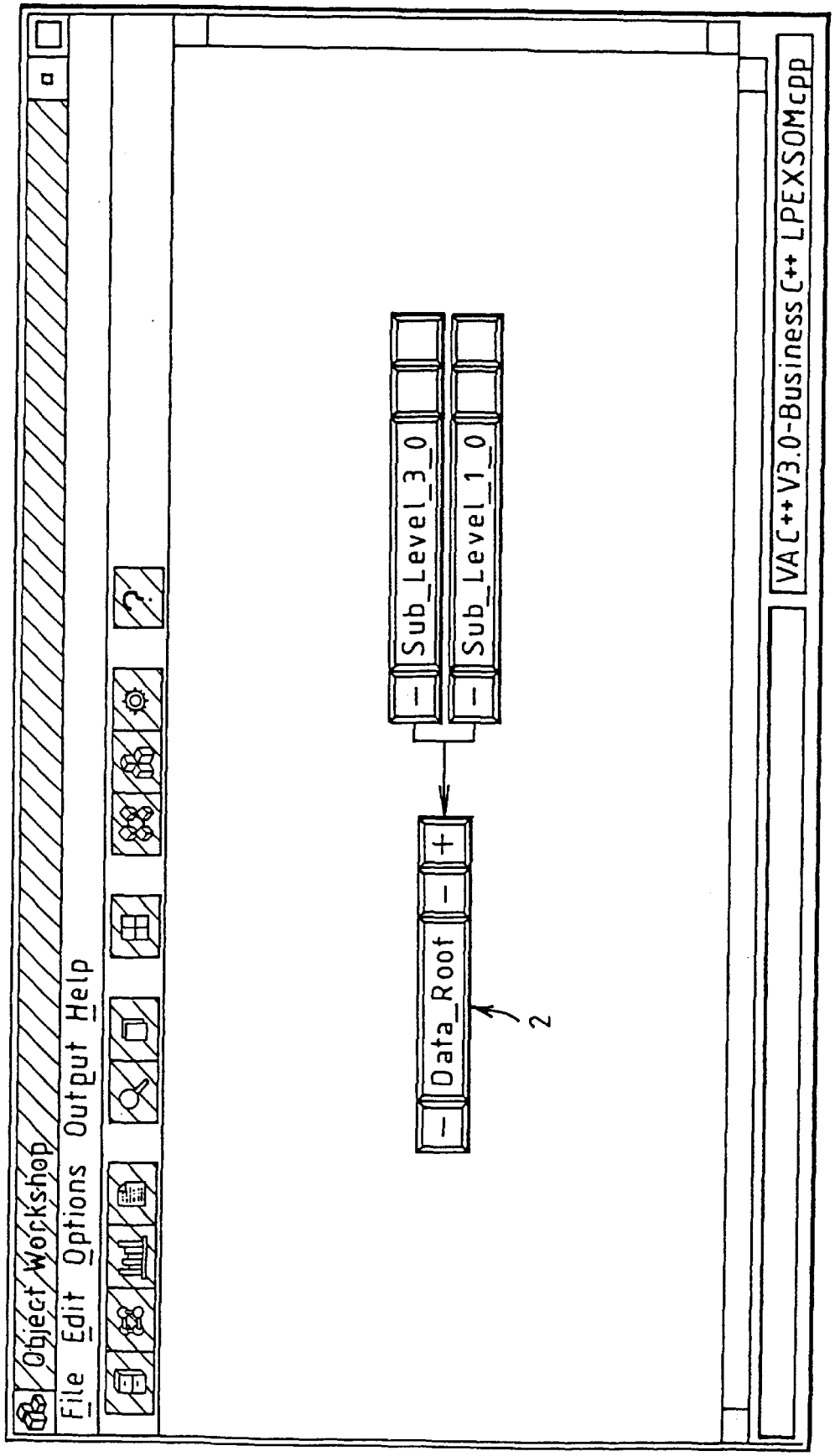

Embodiments of the invention will not be described, by way of example, with reference to the appended source code and the accompanying drawings in which:

FIGS. 1–3 show a hierarchical manipulation technique in accordance with the present invention; and FIGS. 4–6 show alternative representations of the components of the present invention.

Referring to FIGS. 1–3, an example of user interaction with the data to adjust the sub-set of information presented for the work is given. Each component is depicted by a rectangular horizontal bar 2. Each bar comprises a rectangular object identifier region 4 and three square shaped active regions 6, one on the left and two on the right of each component. In the example shown, the leftmost active region 6a depicts with a "−" that the component in question may be removed from the visual screen and stored within the context of a corresponding parent. In FIG. 1, sub_level_2_1 is operated upon by activating the leftmost active region which thereby stores the component within the context of its parent sub_level_2_0 (FIG. 2). After the operation, the parent displays a "+", indicating storage of child information, in the rightmost active region. Thereafter, the rightmost active region of sub_level_2_0 may be acted upon in order to reveal the stored child information. The operation revealed by FIGS. 2 and 3 further reveals the nature of the operation of the leftmost active region. In this operation, the component sub_level_2_0 has been removed into its parent, "Data Root" by activating the leftmost active region. However, the operation only affects the particular component, in this case sub_level_2_0 but does not affect other components in the same sub_level. This increased functionality gives the user considerable advantages and allows the design of a customised visual display so that the user can remove unnecessary and unwanted components/information from the screen at any generation level thus producing a multi-generation customised screen ready for manipulation or other relevant work. Increased functionality such as create/remove facilities allow the permanent restructuring of hierarchies or other object environments.

Associations functions may also be provided which allows sets of linked objects to be set up and manipulated. Other possibilities have been indicated in the introductory portion of this document.

A "−" in the left hand active region 6b of the twin pair of active regions 6b, 6c, as shown in FIG. 3 with respect to the component "Data Root", indicates that child information is visible and activating this active region will remove all dependent children into the context of the parent. After this operation, a "+" symbol in the object identifier region (not shown) may be used to indicate that all child information is stored and this can be used to rebuild the information either entirely or one generation at a time.

Suitable source code routines for performing the unknown steps described above are shown in appendix 1. Functions 1, 2 and 3, entitled "DrawCollapse", "DrawCollapseDescendants" and "DrawExpandDescendents" respectively, carry out similar objectives.

Function 1 draws the lefthand active sub-region 6a. If the entity/component is not a root level object then a "−" is added to the active region and the region is activated to enable the user to "hide" this component and all its sub levels within the parent.

Function 2 draws the lefthand active region 6b of the pair of active regions on the right side of the rectangle. If the component has sub-levels that are displayed then a "−" is placed in the active region and the sub-region is enabled.

Function 3 draws the rightmost active region 6c of the pair of active regions on the right side of the rectangle. If the component has sub-levels and these are not displayed then a "+" is added to the active region to indicate sub-levels can be expanded and the sub-region is enabled.

Functions 4, 5 and 6 are invoked after one of the active regions has been actuated by the user.

Function 4, ExpandDescendants, is triggered when Function 3 sub-regions are actuated. The function recursively identifies all the sub-levels, sub-level-sub-levels etc and displays the information by reference to functions 1, 2 and 3 as appropriate.

Function 5, CollapseInterface, is activated when function 1 sub-regions are activated and "hides" the component and all its sub-levels, but not components on the same sub-level, and activates Function 3 in the parent to show that information may be expanded.

Function 6, CollapseDescendants, is activated when Function 2 sub regions are activated and recursively identifies all sub-levels and withdraws them into the parent, function 3 then adds a "+" to the sub-region if necessary.

Referring to FIGS. 4–6, numerous representations of the arrangement of components and their corresponding active regions are disclosed.

Figure 4A:
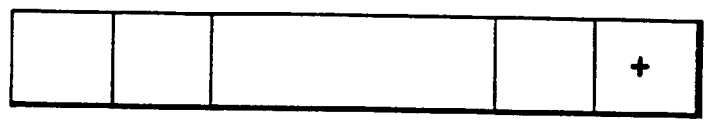
Figure 4B:
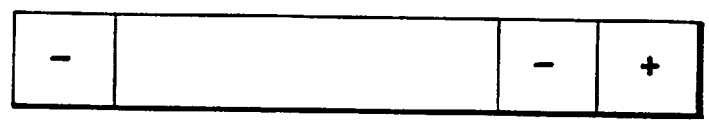
Figure 4C:
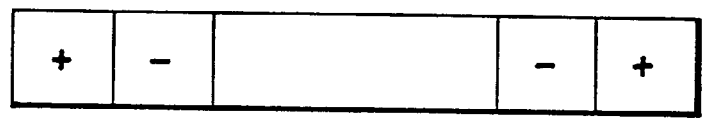
Figure 4D:
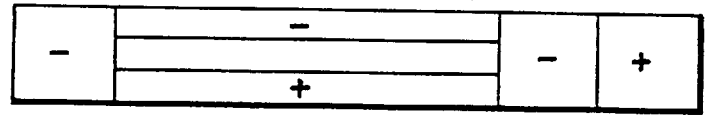
Figure 4E:
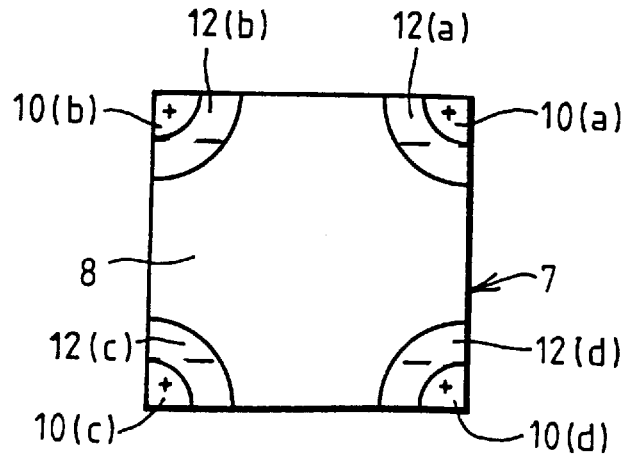

FIG. 4a shows a variation of the examples previously given whereby four active regions are provided in a rectangular bar, two active regions on either side of the bar. FIG. 4b shows the arrangement of active regions already described. FIG. 4c shows a component such as that in FIG. 4a with all four active regions displaying possible operations to be performed. FIG. 4d shows a variation of the rectangular bar arrangement of FIG. 4b whereby two additional rectangular active regions are provided at the top and bottom of the object identifer region thereby providing five active regions in a single horizontal bar component. FIG. 4e shows a variation in component shape whereby a square component 7 is provided with a central object identifier region 8 and two active regions 10, 12 delimited by arcs of varying radii centred at each of the corners of the square. The examples are given mainly to indicate that the number and the arrangement of the active regions with respect to the component and object identifier region are infinitely variable and the presentation of the components may thus be varied to suit the context and type of information for which it is designed to display.

Referring to FIG. 5, active regions 16–22 are provide to allow the components to be utilised in a "zooming" context. In the circular component on the left a "positive" symbol indicates that zooming of information is possible. The middle and rightmost circle show the effect of activating the zooming function in steps which allows the user to increase magnification and work with various sub-components. The developed components indicate both "+" and "−" functionality indicating that the further zooming or restoration to the original component can be carried out. Zooming is particularly useful where association at a high level of granularity of a small number of components has taken place and it is desired to zoom in or work with the various sub-components of the associated higher components. In FIG. 5, the leftmost component may represent a structure or component of large scale granularity. An example may be a disk drive, database, object oriented framework, manufacturing component, business analysis model, warehouse/inventory structure etc, is any form of data to be represented in software that represents composite structures. The manipulation and interaction with this data typically occurs at a number of levels and it is often desirable to interact with a specific component at a more detailed level as shown in FIG. 5. Active regions may be used to facilitate this "zooming". At each progressive stage the contents of the sub-component become increasingly magnified and it is then possible to interact directly with the sub components. In FIG. 5 the objects are in association and further active regions may relate to the associations as are shown in FIG. 6. These further active regions are not shown in FIG. 5 for clarity.

Referring to FIG. 6 active regions providing association linkages are displayed. In FIG. 6 active regions 30–40 are provided in inner and outer circumferential segments surrounding inner identifier regions 42–48. The active regions may be used to expand or contract components, to expand or contract association links, as discussed above with respect to FIG. 5, and to create/remove such links with other components. FIG. 6 shows potential depictions of active regions that provide association linkages. The linkages are usefully viewed and manipulated in conjunction with the "zooming" context of FIG. 5. Many models represented by software contain components related together in some fashion. This is particularly true of object oriented software development which tries to model the "real" world in a more realistic fashion and attempts to develop these models in terms of the associations present in the real world system. Containment relations may be represented via this approach, or just as easily via the granularity in the "zooming" context. "Process" associations to represent "doing" or "action" relationships described in models (e.g. "sends a signal to" or "performs a process on" etc) would be easily captured, presented and manipulated using this mechanism.

The invention is not limited to the embodiments described and, in particular, it is not limited to the functions described and other potential active region functions will be known to the man skilled in the art. In particular, it is envisaged that active regions will be provided in a 3-D context where, for instance, globes could replace the circles of FIGS. 5 and 6.

Function

```
/****************************************************************
①  *    DrawCollapse                                              *
    *    Draw a collapse button.                                   *
    ****************************************************************/
VOID DRAWCollapse   (HPS         hps,
                     POWDATA     pOWData,
                     PINTERFACE  pInterface,
                     BOOL        fScale)
{
    RECTL           rcl;                    /* Button rectangle          */
    /* Draw the border */
    WinSetRect    (pOWData→hab, &rcl,
                    XSCALE(INTERFACELEFT(pInterface), fScale),
                    YSCALE(INTERFACEBOTTOM(pInterface) + pOWData→ulInterfaceHeight,
                    fScale) + 1L,
                    YSCALE(INTERFACETOP(pInterface), fScale) + 1L);
    DrawBorder (hps, &rcl, pOWData, pInterface, fScale);
    /* Fill in the rest */
    rcl.xLeft  +=   1L;
    rcl.xRight -=   1L;
    rcl.yBottom +=  1L;
    rcl.yTop   -=   1L;
    WinFillRect   (hps,&rcl,
                    pInterface→fSelected?
                    pOWData→lHighlightColor[pOWData→Options.lColorScheme]:
                    pOWData→lButtonColor[pOWData→Options.lColorScheme);
    /* Write the collapse symbol */
    * if (strcmp(pInterface→pszId, SOMOBJECT))
        DrawText(hps, &rcl, pOWData, pInterface, "–", fScale);
}
/****************************************************************
②  *    DrawCollapseDescendants                                   *
    *    Draw a collapse button.                                   *
    ****************************************************************/
VOID DrawCollapseDescendants   (HPS         hps,
                                POWDATA     pOWData,
                                PINTERFACE  pInterface,
                                BOOL        fScale)
}
    RECTL           rcl;                    /* Button rectangle          */
    /* Draw the border */
    WinSetRect    (pOWData→hab, &rcl,
                    XSCALE (INTERFACERIGHT (pInterface – pOWData→ulInterfaceHeight *
                    2L), fScale),
                    YSCALE (INTERFACEBOTTOM(pInterface), fScale),
                    SCALE (INTERFACERIGHT (pInterface – pOWDATA→ulInterfaceHeight,
                    fScale) + 1L,
                    YSCALE (INTERFACETOP (pInterface), fScale) + 1L);
    DrawBorder (hps, &rcl, pOWData, pInterface, fscale);
    /* Fill in the rest */
    rcl.xLeft  +=   1L;
    rcl.xRight -=   1L;
    rcl.yBottom +=  1L;
    rcl.yTop   -=   1L;
    WinFillRect   (hps, &rcl,
                    pInterface→lSelected?
```

-continued

| Function |
|---|

```
                    pOWData→lHighlightColor[pOWData→Options.lColorScheme]:
                    pOWData→lButtonColor[pOWData→Options.lColorScheme]);
        /* Write the collapse symbol */
        * if (pInterface→fCollapse)
            DrawText (hps, &rcl, pOWData, pInterface, "-", fScale),
    }
    /********************************************************************
③   DrawExpandDescendants                                                *
    * Draw an expand button.                                              *
    ********************************************************************/
    VOID DrawExpandDescendants  (HPS         hps,
                                 POWDATA     pOWData,
                                 PINTERFACE  pInterface,
                                 BOOL        fScale)
    {
        RECTL              rcl;              /* Button rectangle           */
        /* Draw the border */
        WinSetRect  pOWData→hab, &rcl,
                    XSCALE(INTERFACERIGHT (pInterface - pOWData→ulInterfaceHeight,
                    fScale);
                    YSCALE(INTERFACEBOTTOM (pInterface), fScale),
                    XSCALE(INTERFACERIGHT (pInterface), fScale) + 1L,
                    YSCALE (INTERFACETOP (pInterface), fScale) + 1L);
        DrawBorder (hps, &rcl, pOWData, pInterface, fScale);
        /* Fill in the rest */
        rcl.xLeft +=   1L;
        rcl.xRight -=  1L;
        rcl.yBottom += 1L;
        rcl.yTop -=    1L;
        WinFillRect    (hps, &rcl,
                        pInterface→fSelected?
                        pOWData→lHighlightColor[pOWData→Options.lColorScheme]:
                        pOWData→lButtonColor [pOWData→Options.lColorScheme]);
        /* Write the expand symbol */
        * if (pInterface→fExpand)
            DrawText (hps, &rcl, pOWData, pInterface, "+", fScale);
    }
    /********************************************************************
④   *   ExpandDescendants                                                *
    *   Expand the descendants of an interface.                          *
    ********************************************************************/
    VOID ExpandDescendants(POWDATA pOWData, PINTERFACE pInterface, BOOL fRecurse)
    {
        PGROUPNODE         pChildGroup;      /* Current child group        */
        PINTERFACENODE     pChild;           /* Current child              */
        for (pChildGroup = pInterface→pChildHead;
             pChildGroup;
             pChild = pChildGroup→pNext)
        {
            for  (pChild = pChildGroup→pGroup→pChildHead;
                  pChild;
                  pChild = pChild→pNext)
            {
                if (InterfaceEnabled(pChild→pInterface))
                {
                    ExpandInterface (pOWData, pChild→pInterface), fRecurse);
                    /* If not immediate only, expand descendants */
                    if (fRecurse)
                        ExpandDescendants (pOWData, pChild→pInterface);
                }
            }
        }
    }
    /********************************************************************
5   *   Collapse Interface                                                *
    *   Collapse an interface.                                            *
    ********************************************************************/
    VOID CollapseInterface (POWDATA pOWData, PINTERFACE pInterface)
    {
        PINTERFACENODE     pParent;          /* Current parent             */
        PGROUPNODE         pChildGroup;      /* Child group of parent      */
        PINTERFACENODE     pChild;           /*Child of parent             */
        BOOL               fCollapseDummy;   /* Dummy can be collapsed     */
        /* Collapse the interface */
        pInterface→fDisplay =
        pInterface→fSelected = FALSE;
        If   (pOWData→pInterface == pInterface)
             pOWData→pInterface == NULL;
```

-continued

Function

```
        /* Collapse dummy parents */
        for (pParent = pInterface→pParents→pParentHead;
            pParent;
            pParent = pParent→pNext)
        {
            if  (|pParent→pInterface→pszName)
            {
                /* Make sure dummy is not the parent of another interface    */
                /* that is still displayed                                   */
                fCollapseDummy = TRUE;
                for (pChildGroup = pParent→pInterface→pChildHead;
                    pChildGroup;
                    pChildGroup = pChildGroup→pNext)
                {
                    for (pChild = pChildGroup→pGroup→pChildHead;
                        pChild;
                        pChild = pChild→pNext)
                    {
                        if  (InterfaceDisplayed(pChild→pInterface))
                            fCollapseDummy = FALSE;
                    }
                }
                if  (fCollapseDummy)
                    CollapseInterface(pOWData, pParent→pInterface);
            }
        }
    }
    /***************************************************************************
6    *  Collapse Descendants                                                    *
     *  Collapse the descendants of an interface.                               *
     ***************************************************************************/
    VOID CollapseDescendants(POWDATA pOWData, PINTERFACE pInterface)
    {
        PGROUPNODE       pChildGroup;      /* Current child group   */
        PINTERFACENODE   pChild;           /* Current child         */
        for (pChildGroup = pInterface→pChildHead;
            pChildGroup;
            pChildGroup = pChildGroup→pNext)
        {
            for (pChild = pChildGroup→pGroup→pChildHead;
                pChild;
                pChild = pChild→pNext)
            {
                CollapseInterface(pOWData, pChild→pInterface);
                CollapseDescendants(pOWData, pChild→pInterface);
            }
        }
    }
```

We claim:

1. A method of manipulating objects using an object browser and manipulation system comprising components for representing on a display unit respective objects, the components each comprising an object identifier and at least one active sub-region, the at least one active sub-region having the capability to display information relating to a state of the component and its respective object and having a functionality activatable by an input device to effect an operation in relation to the component, the method comprising the step of:

(a) providing images of a parent component and a child component representing respectively a parent object and an associated child object on the display of the display unit, each component respectively having at least one active sub-region;

(b) receiving an input via the input device to activate the functionality of the at least one active sub-region of the child component; wherein the functionality of the at least one active sub-region of the child component performs an operation in relation to the child component without influencing either the parent component or any other child component of the parent component; and (c) providing on the screen of the display unit an image corresponding with the outcome of the operation of the functionality of the at least one active sub-region of the child component.

2. An object browser and manipulation system comprising components for representing on a display unit respective objects, the components each comprising an object identifier and at least one active sub-region, the at least one active sub-region having the capability to display information relating to a state of the component and its respective object and having a functionality activatable by an input device to effect an operation in relation to the component, the system further comprising:

means for providing images of a parent component and a child component representing respectively a parent object and an associated child object on the display of the display unit, each component having at least one respective active sub-region;

means for receiving an input via the input device to activate the functionality of the at least one active sub-region of the child component; wherein the functionality of the at least one active sub-region of the child component performs an operation in relation to the child component without influencing either the parent component or any other child component of the parent component; and means for providing on the screen of the display unit an image corresponding with the outcome of the operation of the functionality of the at least one active sub-region of the child component.

3. An object browser and manipulation system as claimed in claim 1 characterised in that the functionality activatable by the user effects an operation in relation to both the component and its corresponding object.

4. An object browser and manipulation system as claimed in claim 1 characterised in that an operation in relation to the component includes a screen hide/reveal object function.

5. An object browser and manipulation system as claimed in claim 3 characterised in that an operation in relation to the component and its corresponding object includes one or more functions selected from the following:

a) create object;
b) remove object;
c) move object;
d) add an object association link;
e) remove an object association link;
f) perform a zoom-in function;
g) perform a zoom-out function;
h) provide 3-d extractions.

6. An object browser and manipulation system as claimed in claim 1 characterised in that there are a number of active sub-regions of each component and these can be assigned various functions.

7. An object browser and manipulation system as claimed in claim 1 characterised in that the component can be in any convenient form.

8. An object browser and manipulation system as claimed in claim 7 characterised in that the variable form of the component image is adapted to incorporate the active sub-region.

9. An object browser and manipulation system as claimed in claim 8 characterised in that the active sub regions form a distinct visual part of the component.

10. An object browser and manipulation system as claimed in claim 1 characterised in that the active region visually displays the activatability of the corresponding function.

11. An object browser and manipulation system as claimed in claim 2 characterised in that the functionality activatable by the user offsets an operation in relation to both the component and its corresponding object.

12. An object browser and manipulation system as claimed in claim 2 characterised in that an operation in relation to the component includes a screen hide/reveal object function.

13. An object browser and manipulation system as claimed in claim 11 characterised in that an operation in relation to the component and its corresponding object includes one or more functions selected from the following:

a) create object;
b) remove object;
c) move object;
d) add an object association link;
e) remove an object association link;
f) perform a zoom-in function;
g) perform a zoom-out function;
h) provide 3-d extractions.

14. An object browser and manipulation system as claimed in claim 2 characterised in that there are a number of active sub-regions of each component and these can be assigned various functions.

15. An object browser and manipulation system as claimed in claim 2 characterised in that the component can be in any convenient form.

16. An object browser and manipulation system as claimed in claim 2 characterised in that the active region visually displays the activatability of the corresponding function.

* * * * *